United States Patent

Saito et al.

[11] Patent Number: 5,102,189
[45] Date of Patent: Apr. 7, 1992

[54] VENTILATED SEAT

[75] Inventors: Funitaka Saito; Masami Akiyama, both of Akishima, Japan

[73] Assignee: Tachi-S Co., Ltd., Tokyo, Japan

[21] Appl. No.: 635,945

[22] Filed: Dec. 28, 1990

[51] Int. Cl.⁵ .............................................. A47C 7/72
[52] U.S. Cl. ..................................... 297/180; 422/123; 5/284; 5/423
[58] Field of Search .............. 297/180, 181; 5/284, 5/461, 423; 422/4, 123

[56] References Cited

U.S. PATENT DOCUMENTS

| | | | |
|---|---|---|---|
| 2,022,959 | 12/1935 | Gordon | 297/180 |
| 2,992,604 | 7/1961 | Trotman et al. | 297/180 |
| 4,006,604 | 2/1977 | Seff | 5/284 X |
| 4,303,617 | 12/1981 | Bryson | 422/123 |
| 4,413,857 | 11/1983 | Hayashi | 297/180 |
| 4,452,500 | 6/1984 | Zlotnik | 422/123 X |
| 4,599,755 | 7/1986 | Tominaga | 5/423 X |
| 4,865,816 | 9/1989 | Walz et al. | 422/123 |

*Primary Examiner*—Peter A. Aschenbrenner
*Attorney, Agent, or Firm*—Oldham, Oldham & Wilson, Co.

[57] ABSTRACT

A ventilated seat, in which air is flowed through a duct by means of a fan, and the air is effectively applied to an aromatic in a tray placed in the duct so as to emit a good smell from an air outlet hole on the surface of the seat.

10 Claims, 3 Drawing Sheets

VENTILATED SEAT

BACKGROUND OF THE INVENTION

1. Field of the Invention

The present invention relates to an automotive seat, and in particular to a ventilated seat of an automobile, which permits an air ventilation to be made with an aroma or fragrant smell from within the seat to the interior of the automobile.

2. Description of Prior Art

In automobile, there has been known a ventilation using the seat, in which an air, or a hot air or cooling air is sent from within the seat for air circulation or air-conditioning purpose in the cabin of the automobile. Such seat is generally referred to as "ventilated seat".

Hitherto, the ventilated seat has only for its purpose an air ventilation, and has not contemplated addition of an aroma or a sweet smell therewith.

Recent days find many drivers caring to deodorize air in their cars and automobiles with a fragrant smell and making the car interior better, by use of a perfume or an aromatic. Where the ventilated seat is provided in the car, the driver or occupant on the seat places the aromatic at either the forward or rearward areas of the car cabin, considering a circulation of an aromatic air therein.

However, practically the aromatic air smells at a very limited range about the aromatic body, and does not sufficiently smell over a whole cabin of the car. This problem is dealt by the Japanese Laid-Open Publication No. 56-140355 which discloses a ventilation mat for seat, but it merely recites the provision of a ventilating device and aroma generator within a mat separate from the seat, leaving thus a problem in terms of its non-applicability to the seat per se.

SUMMARY OF THE INVENTION

In view of the above, it is a purpose of the present invention to provide a ventilated seat which enables an effective emission of an aroma or good smell in an automobile.

For such purpose, in accordance with the present invention, a fan and duct are provided in the seat, with a tray arranged in the duct removably, the tray being for receiving therein an aromatic substance, whereby air is flowed through the duct by means of the fan and applied to the aromatic substance in the tray, thereby emitting an aroma from an air outlet hole formed on the surface of the seat.

Accordingly, the aroma is directly sent to an occupant on the seat and sufficiently emitted over a whole cabin of the automobile.

DETAILED DESCRIPTION OF PREFERRED EMBODIMENT OF THE INVENTION

Figure 1:
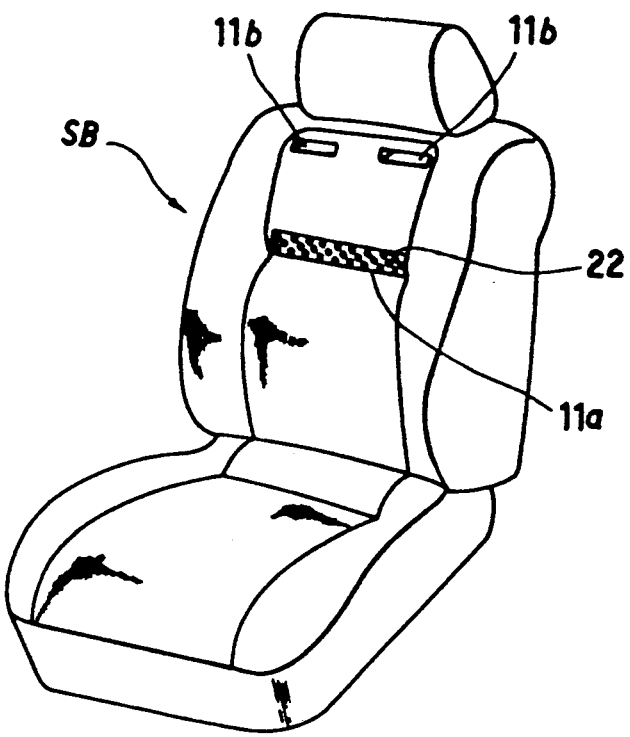
FIG. 1 is a perspective view of a ventilated seat for automobile in accordance with the present invention.

FIG. 1 illustrates a ventilated seat for an automobile in accordance with the present invention.

Designation (SB) stands for a seat back of the seat. On the frontal surface of the seat back (SB), there are formed a pair of spaced-apart air outlet holes (11b)(11b) and a lower elongated air outlet hole (11a). The latter hole (11a) lies horizontally and transversely of the seat back (SB), substantially in parallel with the former ones (11b).

Figure 2:
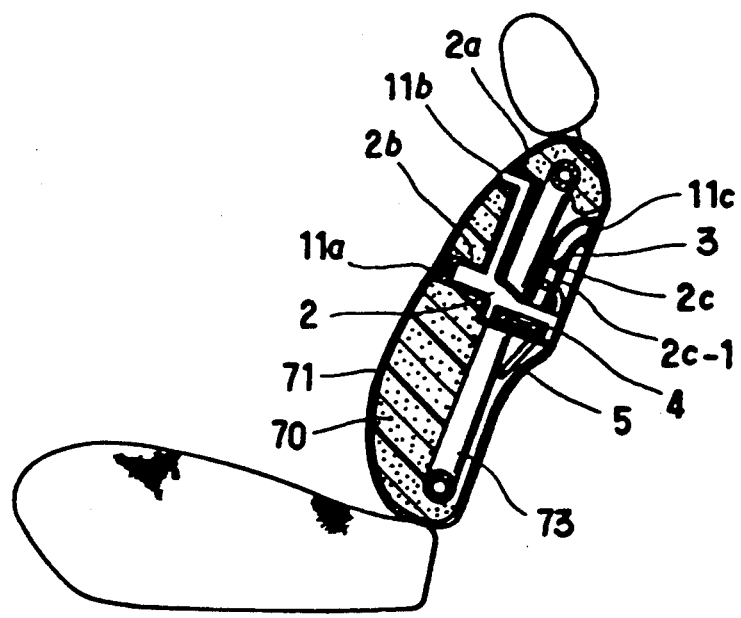
FIG. 2 is a partial sectional view of the seat in the FIG. 1, showing an interior of a seat back of the seat.
Figure 3:
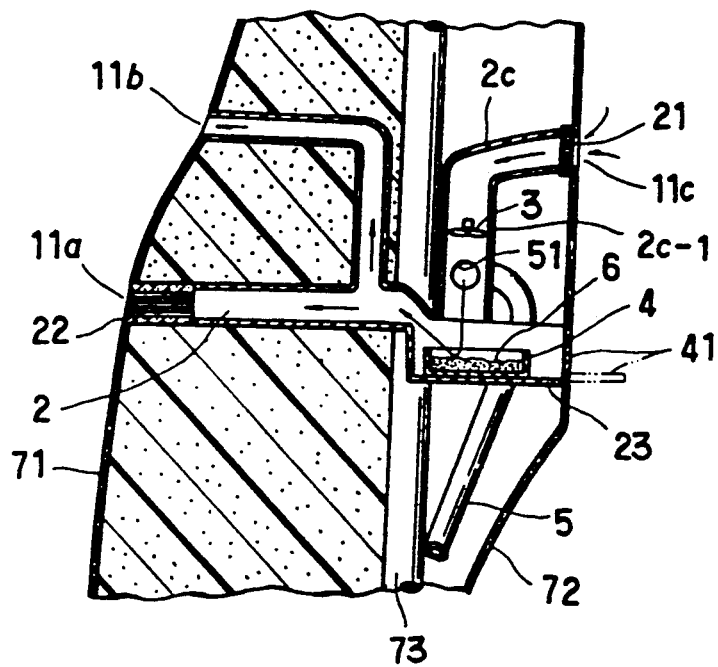
FIG. 3 is a partially enlarged sectional view of the seat back.
Figure 4:
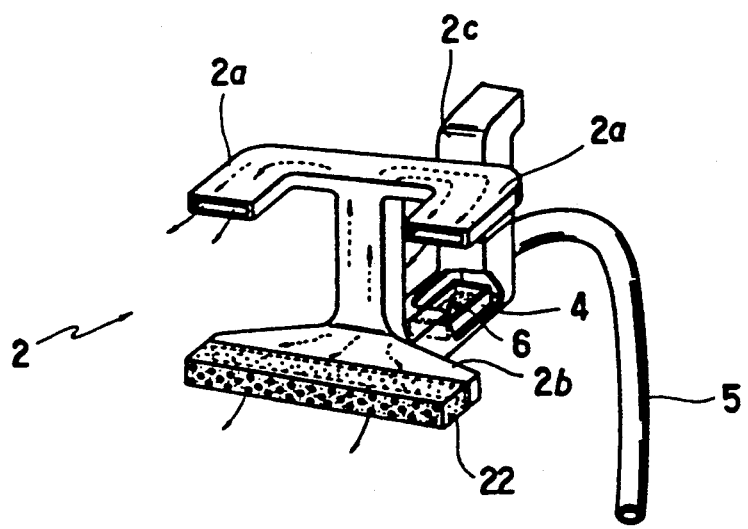
FIG. 4 is a perspective view of a duct assembly.

FIGS. 2, 3 and 4 show a mechanism for supplying and exhausting an aroma or sweet smell, which is built in the seat back (SB).

As best shown in FIG. 4, that aroma generating mechanism includes a duct assembly (2) made of plastics which is so formed to have a bifurcated upper duct section (2a), a lower horizontal duct section (2b) and a rearward air supplying duct section (2c) in the illustrated manner. The upper duct section (2a) terminates in two spaced-apart air outlet parts each corresponding to the respective two air outlet holes (11b) on the seat back (SB), and the lower duct section (2b) is opened in a dimensions corresponding to the lower outlet hole (11a). The lower a foam cushion mass (22) having plural openings perforated therethrough. The cushion mass (22) is disposed within the lower air outlet hole (11a), such that the outer surface of the cushion mass (22) lies flush with edges of the outlet hole (11a), thus forming a part of the frontal surface of the seat back (SB) to thereby prevent an occupant on the seat from feeling at his or her back an unpleasant hardness of the lower duct section (2b). The rearward duct section (2c) extends towards and communicates with a rearward air inlet hole (11c) formed at the rear side of the seat back (SB). As best seen from FIG. 3, in the rearward duct section (2c), there is formed a room (23) for accommodating therein a aromatic tray (4). The aromatic tray (4) receives a desired aromatic substance (6). Hence, as shown, it is preferred that the aromatic tray room (23) is disposed generally midway in the rearward duct section (2c), with the remaining part of the section (2c) extending upwardly or generally vertically from the room (213) to the inlet hole (11c), in order that an air may be directly applied to the aromatic substance (6) and turned its flow towards both upper and lower duct sections (2a)(2b), whereby an aroma is effectively supplied with the air through the two duct sections.

The vertically extending part of the rearward duct section (2c), which is designated at (2c-1) in FIG. 3, is formed with an opening (51) for flow communication with a pipe (5) leading to an air conditioning device (not shown). Further, within such vertical duct part (2c-1), is provided a fan (3) for causing an air to be flowed from the inlet hole (11c) into the duct assembly (2). The fan (3) is electrically driven by operation of a switch (not shown) suitably attached adjacent the seat.

The aromatic tray room (23) communicates with a tray entry opening at the rear side of the seat back (SB), below the air inlet opening (11c), and the tray entry opening is provided with a lid (41) which is pivoted rotatably for opening and closing purpose so that the tray (4) is stored in and removed from the room (23).

Designation (21) denotes an air filter, and designations (71)(72)(73), respectively, denote a surface covering, a foam padding and tubular frame, which form the seat back (SB).

As constructed above, when the fan (3) is driven, an air is flowed in a direction from the inlet hole (11c) to the upper and lower outlet holes (11b)(11a), passing through the duct assembly (2), whereby an aroma is emitted from the aromatic substance (6) and forced out of those outlet holes (11a)(11b).

Accordingly, it is to be appreciated that the sweet-smelling is generated in the seat and emitting therefrom to the interior of the automobile, which not only gives a desired aroma to the occupant on the seat in a direct way, but also realizes an aroma emitting system built in the ventilated seat.

Additionally, as the air conditioning device is connected with the duct assembly (2), a hot or cooling air may be supplied as well.

Figure 5:
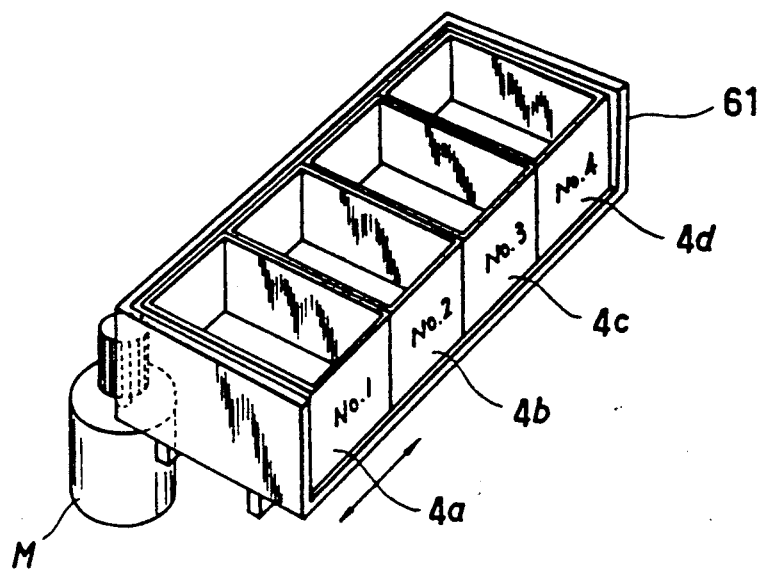
FIG. 5 is a perspective view of one embodiment of a tray transferring mechanism.

FIG. 5 shows a tray transfer device which may be provided at the aforementioned aromatic tray room (23). According thereto, a tray carriage (61), is moved by a motor (M) in a direction transversely of the seat back. In the tray carriage (61), a plurality of aromatic trays, namely four ones as shown, (4a)(4b)(4c)(4d), may be mounted, so that different sorts of aromatic substances may be stored in each of the trays. Thus, by controlling the motor (M), a desired one of the aromatic trays (4a, 4b, . . . ) can be selectively placed at a point right below the above-stated vertical duct section (2c) so as to cause a selected aroma to be supplied through the duct assembly (2).

Figure 6:
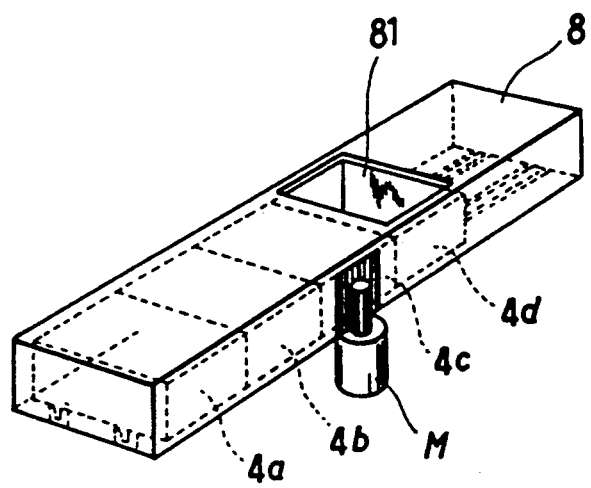
FIG. 6 is a perspective view of another embodiment of the tray transferring mechanism.

FIG. 6 shows another embodiment of the tray transfer device, wherein the plural trays (4a, 4b, 4c, 4d) are slidably accommodated in a container (8) of rectangular parallelepiped configuration. The tray container (8) has, formed at its upper surface, an opening (81) which is disposed right below the vertical duct section (2c) of the duct assembly (2). As illustrated, in this embodiment, each of the trays (4a, 4b, . . . ) is at its lateral wall provided with a rack gear area, and at the lateral wall of the container (8) corresponding to that of the trays, is perforated another opening through which the rack gear area each of the trays is exposed for mesh engagement with the pinion gear of a motor (M). Thus, controlling the motor (M) causes the sliding transfer of the trays (4a, 4b . . . ) in the longitudinal direction of the container (8), so as to place a selected one of the trays at the foregoing opening (81), and therefore a desired aroma can be emitted therefrom through the duct assembly (2). In this embodiment, of course, the container (8) is disposed at the tray room (41), extending in a direction transversely of the seat back (SB).

In both embodiments in FIGS. 5 and 6, a proper control switch means is preferably provided for electrical connection with the motor (M).

While having described as above, it should be understood that the present invention is not limited to the illustrated embodiments, but any other modifications, replacements and additions may structurally be possible without departing from the spirit and scope of the appended claims.

What is claimed is:

1. A ventilated seat for an automotive seat, comprising:

at least one air outlet which is formed at an upper part of seat back of said seat such as to cause a flow of air into and within said seat;

a fan means formed within said seat;

a duct means arranged within said seat for establishing flow communication between said at least one air outlet and said fan means;

a tray for containing an aromatic therein, said tray being removably provided in said duct means, such that said tray may be placed in said duct means and removed therefrom as well as from said seat; and a means for allowing ingress and egress of said tray into and from said duct mans through said seat.

2. The ventilated seat according to claim 1 wherein said fan means is provided adjacent to said duct means so as to cause a flow of air through said duct means, and wherein, to the area of the duct means wherein said fan means is disposed adjacently, is connected a pipe associated with an air-conditioner means.

3. The ventilated seat according to claim 1, further including an additional air outlet below the aforesaid at least one air outlet which is formed at an upper part of the seat back, said additional air outlet being provided with an air permeable foam cushion member.

4. The ventilated seat according to claim 1, wherein said means for allowing ingress and egress of said tray comprises an opening formed at a rearward side of said seat, so that said aromatic tray means may be placed in or removed from said duct means.

5. The ventilated seat according to claim 1 wherein each said air outlet which is formed to an upper part of said seat back includes a hole formed on a frontal surface of said seat back.

6. The ventilated seat according to claim 1, further including an air inlet on a rearward side of said seat back and wherein said duct means further includes an inlet duct section extending from said air inlet to said fan means.

7. The ventilated seat according to claim 1, wherein said tray comprises a plurality of trays for permitting plural different sorts of aromatics to be stored therein, and wherein said trays are slidably accommodated in a tray container which has an opening formed therein, such that said trays can be moved in said container from one another in order to place one of them at said opening, thereby allowing supply of a desired aromatic through said duct means to said air outlet hole, and emitting it therefrom.

8. The ventilated seat according to claim 7, wherein each of said trays can be moved by a motor.

9. A ventilated seat for an automotive seat, comprising:

at least one air outlet formed on a surface of said seat;

a fan means formed within said seat;

a duct means arranged within said seat for establishing flow communication between said at least one air outlet and said fan means; and a plurality of trays for permitting plural different sorts or aromatics to be stored therein, wherein each of said trays can be slidingly moved to selectively stop across said duct means whereby a favorite aroma is emitted from a selected one of the trays.

10. The ventilated seat according to claim 9, wherein each of said trays can be moved by a motor.

* * * * *